Nov. 19, 1935.    H. McGILL    2,021,460
VARIABLE SPEED POWER TRANSMISSION MECHANISM
Filed May 29, 1935    2 Sheets-Sheet 1

Inventor:
Henry McGill
By
Attorney

Nov. 19, 1935.  H. McGILL  2,021,460
VARIABLE SPEED POWER TRANSMISSION MECHANISM
Filed May 29, 1935  2 Sheets-Sheet 2

Inventor:
Henry McGill
By [signature]
Attorney

Patented Nov. 19, 1935

2,021,460

UNITED STATES PATENT OFFICE 2,021,460

VARIABLE SPEED POWER TRANSMISSION MECHANISM

Henry McGill, Canterbury, Victoria, Australia

Application May 29, 1935, Serial No. 24,114
In Australia April 12, 1934

9 Claims. (Cl. 74—260)

This invention relates to variable speed power transmission mechanism of the planetary type in which the speed is varied automatically between a one to one drive and speeds reduced indefinitely by the restraining action of centrifugal weights or inertia masses upon one or more planetary gears carried by a driving or driven casing or member and meshing with a sun gear on a driven or driving shaft or member.

The specification of my prior United States Patent No. 1,983,916 of December 11, 1934, discloses such a mechanism in which the weights are supported by a carrier or spider which is secured to the planet pinion spindle and provided with radial slots along which the weights slide while travelling along the eccentric path defined by inner and outer circular members.

The present invention concerns mechanism of the general kind indicated but embodying features of design, construction and arrangement which make for greater efficiency, simplicity in construction, practically noiseless operation and other practical advantages which will be apparent hereafter. According to the present invention the or each planet gear, or a member revoluble therewith, is connected by a circumferential ring of pivoted links to a corresponding number of weights which are guided in an annular race which is supported on the planet carrier eccentrically with respect to the associated planet gear.

As the driving shaft rotates the centrifugally influenced weights tend to be thrown outwardly from the centre of rotation but are constrained by the guide channel or race to follow the circular path eccentric to the axis of the planet pinion. Owing to the weights being pivotally connected to the member fast with the planet pinion the force of the centrifugally influenced weights is transmitted with increased effect to the member to which the weights are pivotally connected so that rolling of the planet pinion about a sun pinion or ring gear is continuously opposed.

A very high efficiency is thus obtainable, the losses due to friction being minimized. Wear upon the moving parts is also reduced to a minimum and it becomes possible to provide a compact assembly of comparatively few moving parts none of which are liable to distortion or excessive wear, strain or friction.

But in order that this invention may be better understood reference will now be made to the accompanying sheets of drawings which are to be taken as part of this specification and read herewith—

Figures 1, 2:
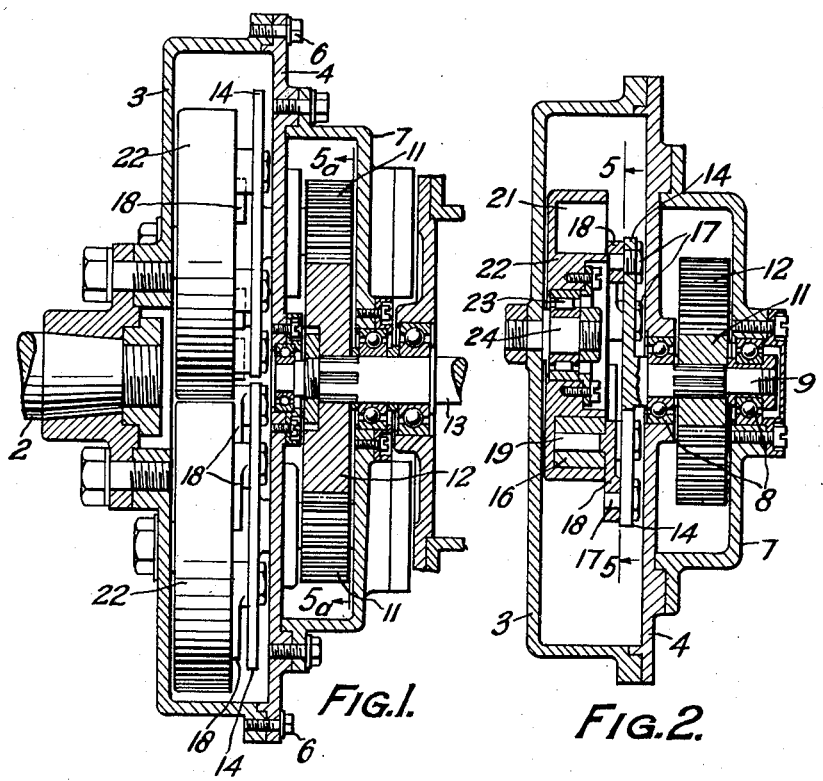
Figure 1 is a sectional elevation of mechanism according to one practical embodiment of the invention, the section being taken approximately on line I—I of Figure 5.
Figure 2 is a sectional elevation taken on line II—II of Figure 5.
Figure 5:
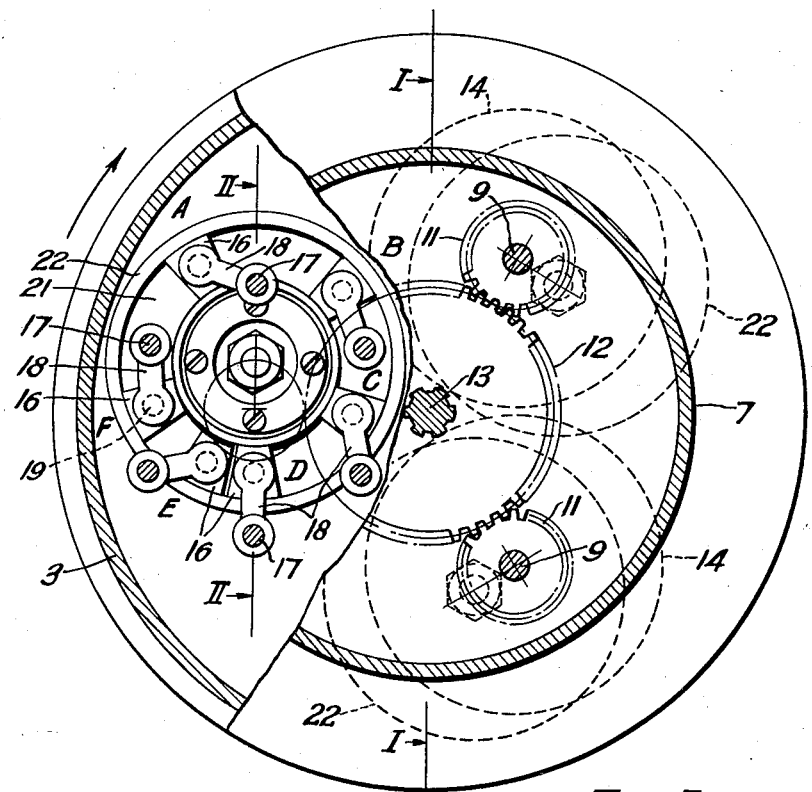
Figure 6:
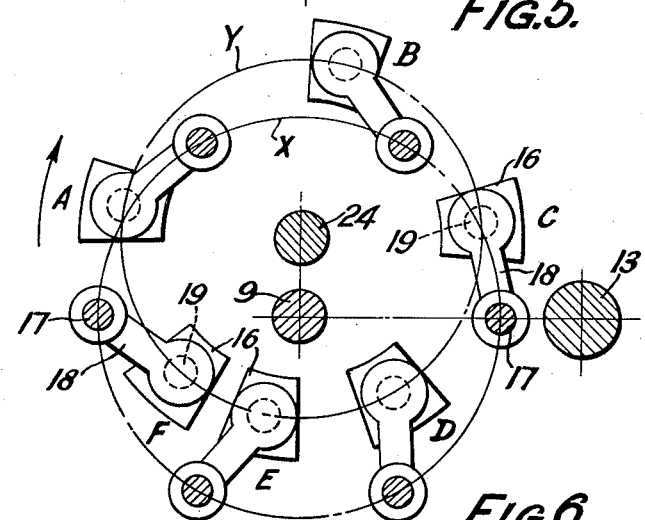

Figure 5 is a cross sectional view of the mechanism seen in Figures 1 and 2, the left hand portion of the section being taken on line 5—5 of Figure 2 and the right hand section being taken on line 5a—5a of Figure 1;

Figure 6 is a somewhat diagrammatic face or side view showing a series of the weights in positions different from those occupied by the weights in Figures 1, 2 and 5.

According to the embodiment illustrated the driving or driven shaft 2 has fast therewith two longitudinally spaced plates 3, 4. Plate 3 has a peripheral flange to which plate 4 is secured as at 6 so as to form a housing for enclosing the weights and other parts and a carrier for the planet pinions as will be described hereinafter. Plate 4 and a cover plate 7 secured thereto may be provided with bearings 8 to support spindles 9 on which the planet pinions 11 may be splined or otherwise made fast. There may be any convenient number of such spindles and planet pinions, say, three, arranged at 120° apart. The planet pinions are shown meshing with a sun wheel 12 on a shaft 13 which may be suitably clutched to the driven or driving shaft, but they may, if desired, be meshed with a ring gear connected to the driven or driving shaft.

Each planet pinion spindle has an attached or integral disc 14 to which the weights 16 are pivotally anchored. Each disc is therefore provided at equidistantly spaced intervals on a pitch circle concentric with the axis of the planet pinion with a suitable number (say six) of pivot pins 17 which may be bushed and encircled by the apertured ends of arms 18 projecting from the respective weights.

These weight arms are preferably considerably less massive than the weights and, as seen in Figures 2, 5 and 6, may have gudgeon pins 19 at their outer ends fitting rotatably into central apertures of the weights which are capable of sliding circumferentially in a circular channel or race 21 which is eccentric to the axis of the planet pinion and may be formed in a ring like member 22. This ring member may, if desired, be secured to plate 3 but preferably it is rotatably supported as by a ball or roller bearing 23 about a stub axle 24 eccentric to the planet pinion and retained to the plate 3. The throw or eccentricity of the weight guide channel or race relative to the respective planet pinion should extend substantially tangentially to the orbit of the planet pinion and in the direction of rotation of the driven or driving shaft 13 as will be clear from Figures 5 and 6 in which the arrows indicate the direction of rotation of the driven or driving shaft.

Upon rotation of the driving shaft and the housing formed by plates 3, 4 and 7 the centrifugally influenced weights 16 tend to be flung outwardly from the centre of rotation but are constrained by the race 21 to follow a circular path eccentric to the axis of the respective planet pinion. As the weights are pivotally anchored about the pins 17 of the disc 14 a pressure will be exerted on the pins 17 tending to rotate the operating disc 14. The force developed by the centrifugally influenced weights is balanced by a normal reaction on the sides of the race 21 and a pressure through the weight arms 18 onto the pivot pins 17. The turning moments of some of the weights of each group will act in opposition to rolling of the planet pinion, while the turning moments of the other weights tend to assist rolling of the planet pinion but at all positions the total moments tending to oppose rolling of the planet pinion will materially exceed the total moments tending to assist rolling the planet pinion. The two approximately extreme positions of the weights are shown in Figure 5 and Figure 6. These extreme positions are relative displacements of the weights as they are carried round between elements of constant mutual eccentricity. In the former which shows the weights in positions affording minimum unbalanced turning moments, the turning moments applied to the disc by weights A and B are tending to oppose rolling of the planet pinion, while the turning moments applied to the disc by weights C, E, F are tending to assist rolling of the planet pinion. The weight D is in neutral position. The weights open out and close in together as they are carried round the race.

In Figure 6 which shows the positions affording maximum unbalanced moments the weights A, B and C are opposing rolling of the planet pinion and weights D, E and F tending to assist rolling of the planet pinion. In this figure the chain dot circle X represents the pitch circle of the weight anchoring pins 17 of the disc 14, and the chain dot circle Y represents the centre of the weight race 21.

When the mechanism operates as a 1 to 1 gear the weights will take up positions between those giving the minimum and maximum values of effective turning moment so that the effective turning moment developed by the weights will just balance the torque presented by the driven member, the planet pinions becoming locked to the sun wheel to effect direct drive.

In order that the maximum effective turning moment may be obtained for any given speed of the driving member the following conditions should be observed:—

1. The weight path should have its eccentricity extending along a line tangential to the orbit of the planet pinion and in the direction of rotation of the driving member.

2. The distance on the tangential line between the pitch circle of the weight anchoring pins 17 and the middle line of the weight race should be minimum in the direction of rotation of the driving member.

3. The distance between the centres of each weight and its anchoring pin should be substantially the same as the distance between the pitch circle of the weight anchoring pins and the middle line of the weight race measured on the tangential line in a direction the reverse of that of the rotation of the driving member.

The frictional losses occurring during operation of the mechanism in an arrangement in which the race 21 is free to rotate are so slight as to be practically negligible. There will be slight friction due to the turning of the gudgeon pins 19 within the weights 16 but this will be considerably less than the friction which occurs where the weights are required to slide along radial guides or slots as previously proposed. The only sliding friction is then that due to the alterations of the positions of the weights in the channel or race 21 relative to each other but this is minimized owing to the fact that the major portion of such relative movement takes place when the pressure of the weights upon the race is at minimum value. Thus maximum efficiency will be obtained and the mechanism will be substantially silent in operation.

Any suitable reversing gear may be associated with the mechanism.

Figure 4:
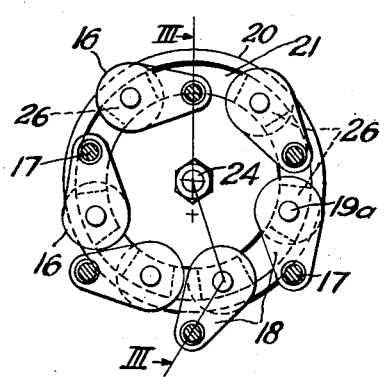
Figure 4 is a face view of the weights and associated parts of Figure 3.
Figure 3:
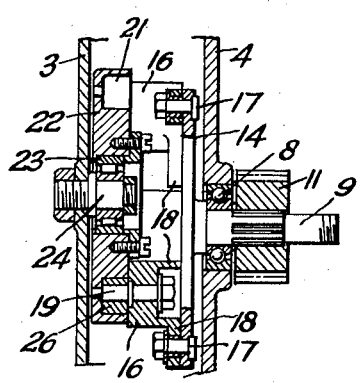
Figure 3 is a fragmentary section similar to Figure 2 but showing a modification, the section being taken on line III—III of Figure 4.

According to the modification illustrated in Figures 3 and 4 the weights 16 instead of fitting within the race 21 of the ring member 22 may be formed integral with the arms 18 and be apertured to receive a gudgeon pin 19a which extends into a block 26 slidably accommodated within the race 21.

With the embodiments previously described herein the forces opposing rolling of the planet pinions will fluctuate as the weights of each series move from positions of maximum turning moment into positions of minimum turning moment and vice versa.

I claim:

1. An automatically variable power transmission mechanism of the planetary type including a planet gear, a planet carrier, an annular race supported on said planet carrier eccentrically with respect to said planet gear, weights guided for movement in said annular race, and a circumferential ring of pivoted links connecting said planet gear with said weights.

2. An automatically variable power transmission mechanism of the planetary type including a planet gear, a member revoluble therewith, a planet carrier, an annular race supported on said planet carrier eccentrically with respect to said planet gear, weights guided for movement in said annular race, and a circumferential ring of pivoted links connecting the member revoluble with said planet gear with said weights.

3. An automatically variable power transmission mechanism of the planetary type including a plurality of planet gears, a planet carrier, a plurality of annular races, each supported on said planet carrier eccentrically with respect to one of said planet gears, weights guided for movement in said annular races, and a circumferential ring of pivoted links connecting each of said planet gears with the weights in the associated annular race.

4. An automatically variable power transmission mechanism of the planetary type including a planet pinion, a planet carrier, an annular race supported on said planet carrier eccentrically with respect to said planet gear, weights guided for movement in said annular race, and arms on said weights pivotally connected with said planet pinion, said arms serving to transmit the force exerted by the centrifugally influenced weight to said planet gear.

5. An automatically variable power transmission mechanism of the planetary type including a planet pinion, a disc-like member revoluble therewith, a planet carrier, an annular race supported on said planet carrier eccentrically with respect to said planet pinion, a plurality of weights guided for movement in said annular race, and a plurality of arms, said arms being connected at one end with weights and pivotally connected at their other ends with said disc-like member at intervals on a pitch circle concentric with said planet pinion.

6. An automatically variable power transmission mechanism of the planetary type including a planet pinion, a member revoluble therewith, a planet carrier, an annular race supported on said planet carrier constituting an eccentric path with respect to said planet pinion, weights slidable circumferentially in said eccentric path, and arms connecting said weights with said member revoluble with the planet pinion, said weights being journalled on pins projecting from said arms.

7. An automatically variable power transmission mechanism of the planetary type including a planet pinion, a member revoluble therewith, a planet carrier, an annular race supported on said planet carrier constituting an eccentric path with respect to said planet pinion, weights each provided with an anti-friction member slidable circumferentially in said eccentric path, and arms connecting said weights with the member revoluble with the planet pinion.

8. An automatically variable power transmission mechanism of the planetary type including a planet pinion, a member revoluble therewith, a planet carrier, an annular race supported on said planet carrier constituting an eccentric path with respect to said planet pinion and formed in a member rotatable about the axis of the eccentric path, weights slidable circumferentially in said eccentric path, and arms connecting said weights with the member revoluble with the planet pinion.

9. An automatically variable power transmission mechanism of the planetary type including a planet pinion, a member revoluble therewith, a planet carrier, an annular race supported on said planet carrier constituting an eccentric path with respect to said planet pinion, said path formed in a member rotatably supported about an axis mounted on the planet pinion carrier, weights slidable circumferentially in said eccentric path, and arms connecting said weights with the member revoluble with the planet pinion.

HENRY McGILL.